May 22, 1923.
J. K. EXUM
1,456,374
SIDE DUMP VEHICLE
Filed June 20, 1922 3 Sheets-Sheet 1
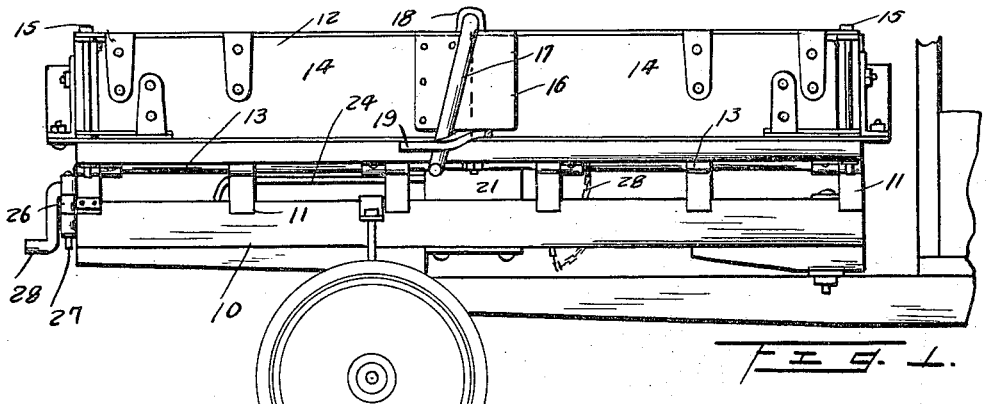
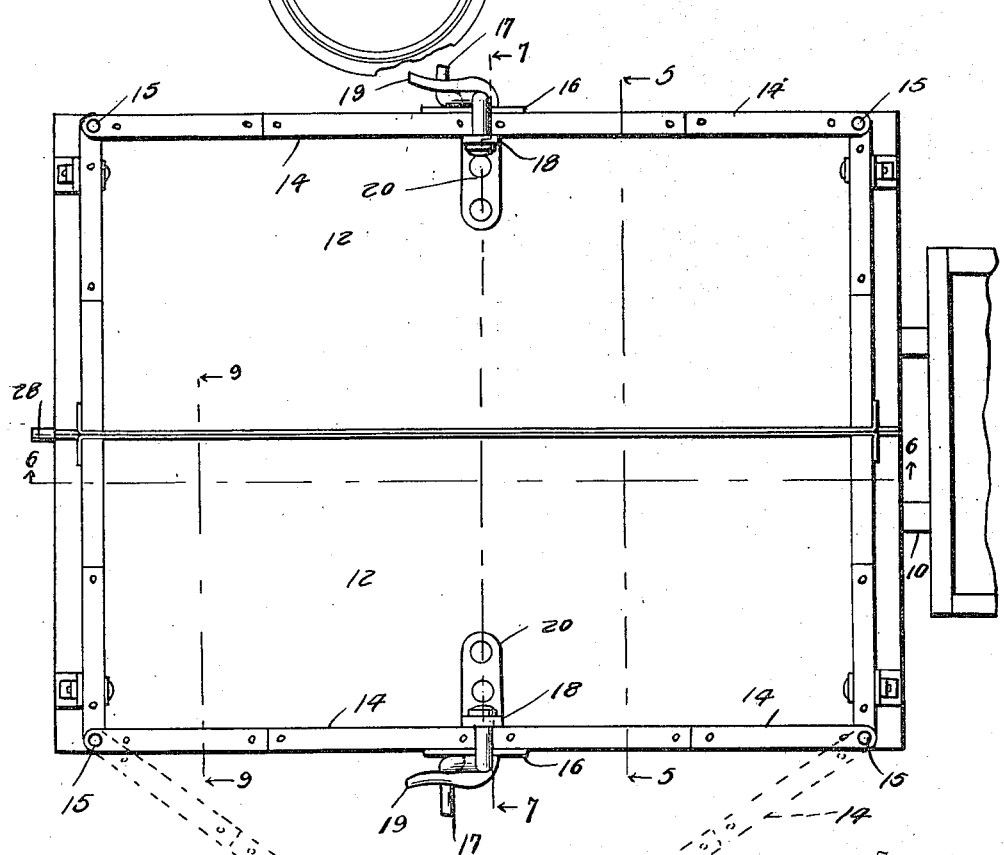
Inventor
J. K. Exum,
By
Attorney May 22, 1923.
J. K. EXUM
SIDE DUMP VEHICLE
Filed June 20, 1922
1,456,374
3 Sheets-Sheet 2
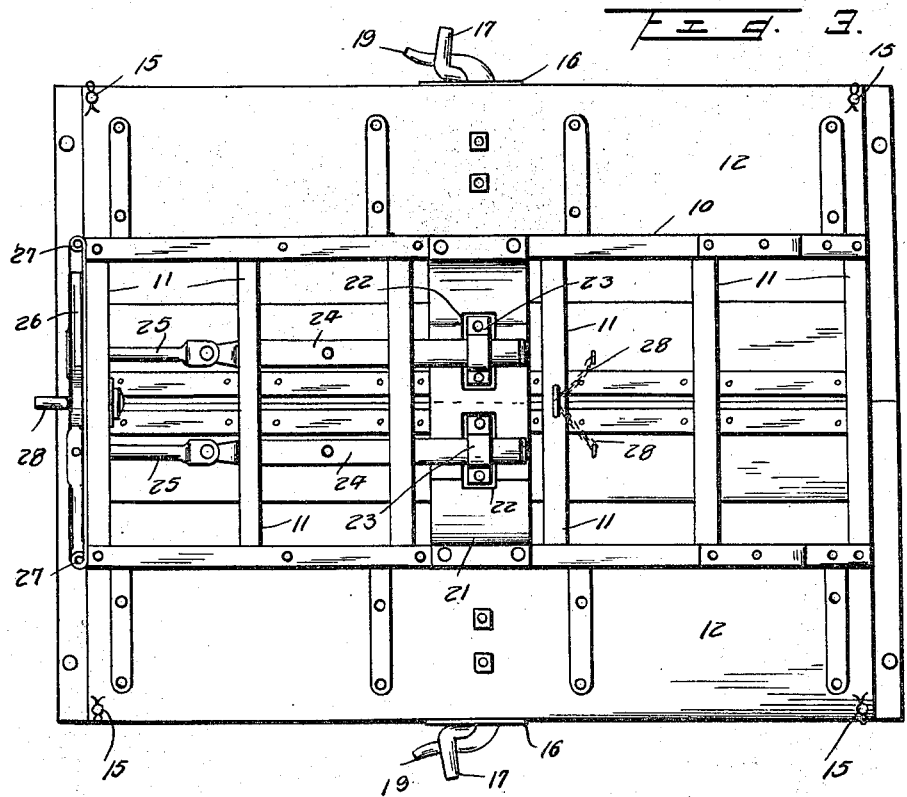
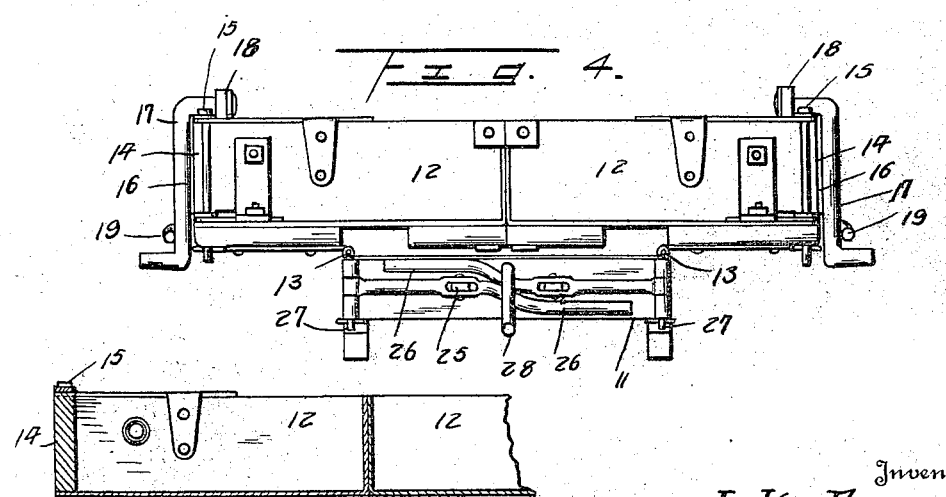
Inventor
J. K. Exum May 22, 1923.
J. K. EXUM
SIDE DUMP VEHICLE
Filed June 20, 1922
1,456,374
3 Sheets-Sheet 3
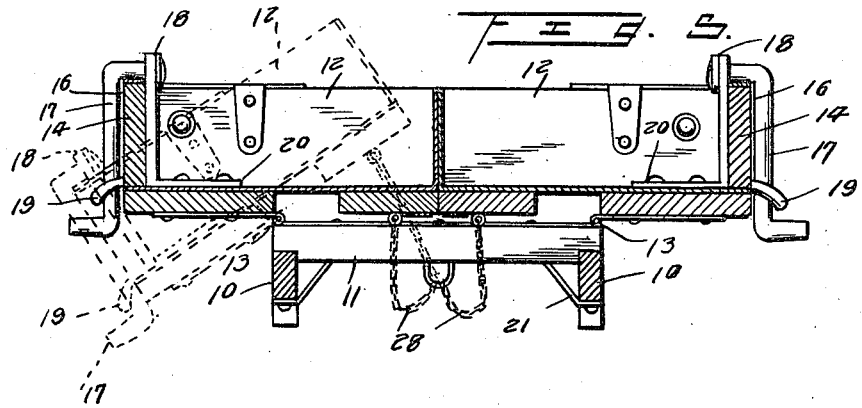
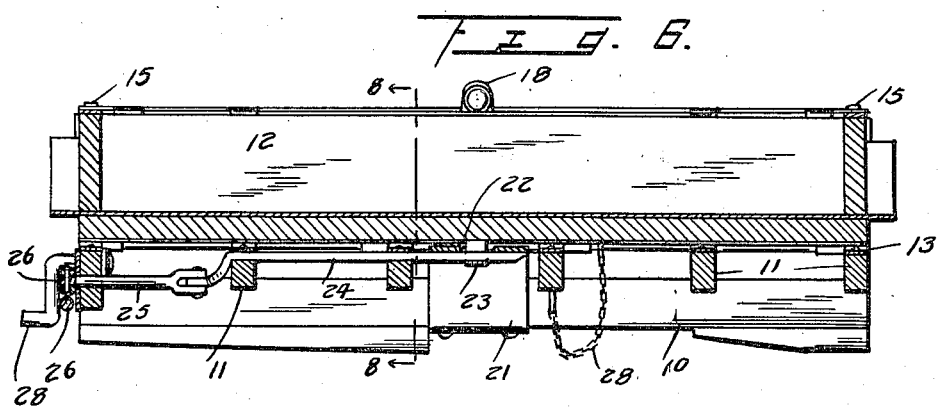
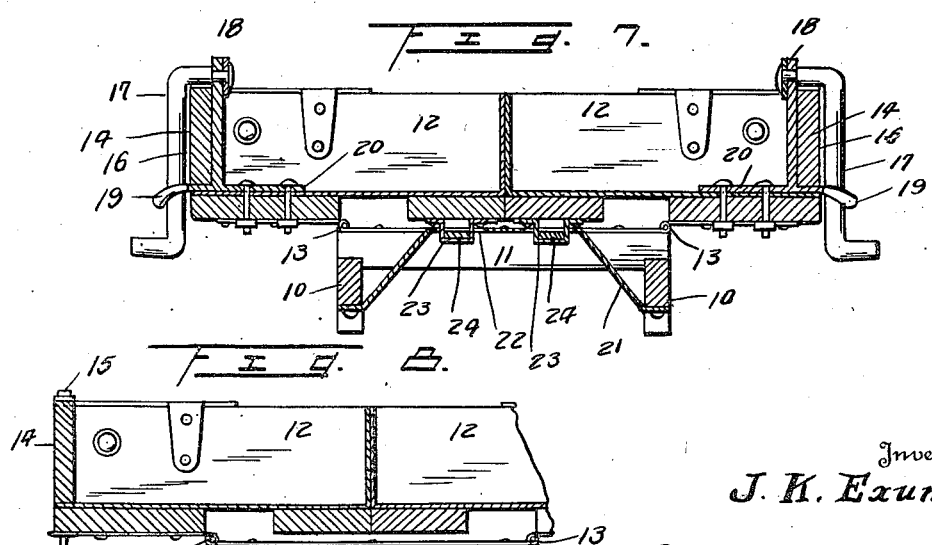
Inventor
J. K. Exum.

Patented May 22, 1923.

1,456,374

UNITED STATES PATENT OFFICE.

JOSEPH K. EXUM, OF MILLTOWN, GEORGIA.

SIDE-DUMP VEHICLE.

Application filed June 20, 1922. Serial No. 569,675.

*To all whom it may concern:*

Be it known that I, JOSEPH K. EXUM, a citizen of the United States, residing at Milltown, in the county of Lanier and State of Georgia, have invented certain new and useful Improvements in Side-Dump Vehicles; and I do hereby declare the following to be a full, clear, and exact description of the invention, such as will enable others skilled in the art to which it appertains to make and use the same.

The primary object of this invention is the provision of a vehicle which enables the load to be dumped laterally or at the side in contradistinction to the usual rear dump, whereby the unloading is greatly facilitated and made possible in places where rear dumping is practically impossible, as in narrow alleyways and roads.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side elevation of a side-dump vehicle body embodying the invention, Figure 2 is a top plan view thereof, the dotted lines indicating a side of the body partly swung outwardly, Figure 3 is a view of the vehicle body as seen from below, Figure 4 is a rear end view, Figure 5 is a transverse section on the line 5—5 of Figure 2, the dotted lines indicating a section or box of the body tilted to dump the load laterally, Figure 6 is a longitudinal section on the line 6—6 of Figure 2, Figure 7 is a transverse section on the line 7—7 of Figure 2, Figure 8 is a sectional detail on the line 8—8 of Figure 6, looking towards the rear as indicated by the arrows, and Figure 9 is a sectional detail on the line 9—9 of Figure 2, looking towards the rear as designated by the arrows.

Corresponding and like parts are referred to in the following description and designated in the several views of the drawings by like reference characters.

The numeral 10 designates the running gear of a vehicle and the same may be of any construction, depending upon the nature and type of the vehicle and the particular purpose for which the same has been designed. The bed upon which the body is mounted includes crosspieces 11 and is of such width as not to interfere with the lateral or side dumping of the load.

The body of the vehicle is preferably of sectional formation, the sections being of such construction and pivotally mounted to admit of dumping the load at either side as required. In the present instance, the body is shown as comprising similar sections 12 each of box form and mounted to tilt laterally to dump the load at the side of the vehicle. The sections 12 may be of any construction and pivotally mounted in any preferred way. As illustrated, each of the sections 12 is pivoted or hinged at 13 to the bed of the running gear, approximately one-half of each of the sections 12 projecting beyond the bed so as to readily tilt and dump the load laterally or at the side of the vehicle when required. To facilitate the dumping, the outer side of each of the sections or boxes 12 is movable and preferably comprises leaves 14 which are pivoted at 15 to the outer corners of the box or section 12. A plate 16 secured to one of the leaves is adapted to overlap the adjacent end of the companion leaf thereby bracing and closing the joint. A latch 17 pivoted to a standard 18 extends over the upper edge of the movable side and engages the plate 16 and serves to confine the ends of the leaves 14 between the standard 18 and latch 17, whereby said ends are prevented from inward or outward movement. The standard 18 is secured at its lower end to the bottom of the section or box and the engaging portion of the latch 17 is of a length to extend along the outer side of the plate 16 and below the bottom of the section or box to engage a catch 19 secured to the bottom of the section and preferably forming a part or extension of the foot 20 of the standard 18.

A transverse brace 21, attached to the bed of the running gear, has openings 22 formed therein to receive keepers 23 attached to the bottom side of the sections or boxes 12. Lock bars 24, longitudinally slidable in certain crosspieces 11 of the bed, are adapted to engage the keepers 23 and retain the sections or boxs 12 in normal position upon the bed to prevent premature dumping of the load. A link 25 pivotally connects the outer or rear end of each of the lock bars 24 with an operating lever 26 pivoted at 27 to the rear of the bed. The operating levers 26 are adapted to overlap as indicated most clearly in Figure 4 and are prevented from outward displacement by means of a latch 28 which is pivoted to the rear crosspiece of the bed.

In practice, the body of the vehicle receives the load in the usual way and said load may be dumped laterally or at the side of the vehicle by operating the latch 17 to release the leaves 14 and operating a lever 26 to disengage the lock bar 24 from the section or box 12 to be tilted to dump the load. When the section or box 12 is released from the lock bar 24, it may be easily and readily tilted to dump the load. A chain or analogous connection 28 limits the tilting of the section or box as indicated most clearly in Figure 5. It will be understood that the load may be dumped at both sides of the body and if required a commodity of one kind may be supplied to one of the sections or boxes and a commodity of a different kind may be supplied to the other section or box and the same may be dumped at different places and at different times. A vehicle body constructed in accordance with the present invention is admirably adapted for road construction, since it facilitates the dumping of the load at the required point and obviates the loss of time incident to backing for the purpose of dumping. In alley ways and narrow streets the load may be easily and quickly dumped and where suitable openings are provided coal and like commodity may be delivered so as to be readily housed.

What is claimed is:

1. A vehicle body comprising a side including pivoted leaves, a standard disposed to engage the leaves at one side, and a latch pivoted to the standard and adapted to engage the leaves upon the opposite side, said leaves being confined between the standard and latch.

2. In a vehicle body comprising pivoted leaves, forming a side thereof, a standard attached to the bottom of the body and having a catch projecting therefrom, and a latch pivoted to the standard and adapted to extend along the opposite sides of the leaves and engage said catch, said leaves being confined between the standard and latch.

3. A vehicle comprising a bed and similar body sections hinged thereto and adapted to dump the load laterally or at the side of the vehicle, a keeper carried by each body section, lock bars slidably mounted upon the bed and adapted to engage the respective keepers, operating levers for actuating the respective lock bars and adapted to swing outwardly and arranged to overlap when the lock bars are in engagement with said keepers, and a latch mounted upon the bed and adapted to engage the operating levers to retain them in normal position.

In testimony whereof I affix my signature in presence of two witnesses.

JOSEPH K. EXUM.

Witnesses:
 W. H. STUDSTILL,
 J. S. SIRMANS.